UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

YELLOW DYE.

935,016.  Specification of Letters Patent.  Patented Sept. 28, 1909.

No Drawing.  Application filed May 4, 1909.  Serial No. 493,772.

*To all whom it may concern:*

Be it known that we, OSCAR GÜNTHER and LEOPOLD HESSE, doctors of philosophy, chemists, citizens of the German Empire, residing at Elberfeld, Germany, have invented new and useful Improvements in New Dye, of which the following in a specification.

Our invention relates to the manufacture and production of new azo dyestuffs dyeing unmordanted cotton yellow shades fast to light. The process for their production consists in transforming sulfonic acids of aminoazo compounds of the benzene series into the symmetrical diarylurea compounds by treatment with phosgen. The new dyes are after being dried and pulverized in the shape of their alkaline salts dark yellow powders soluble in water with a yellow and soluble in concentrated sulfuric acid with a reddish color. Upon reduction with stannous chlorid and hydrochloric acid an aminosulfonic acid of the benzene series and an urea of a diamin is obtained which is split up into carbonic acid and a diamin.

To illustrate our process we can proceed as follows; the parts being by weight:—658 parts of the sodium salt of the aminoazo dyestuff: para-aminobenzene sulfonic acid + ortho-anisidin are dissolved in 9000 parts of water. Into this solution which has to be kept alkaline during the whole reaction phosgen is introduced while stirring until the production of the urea is complete. The new dye is after being dried and pulverized in the shape of its sodium salt a dark yellow powder soluble in water with a yellow color and soluble in concentrated sulfuric acid with a red color; yielding upon reduction with stannous chlorid and hydrochloric acid para-aminobenzene sulfonic acid and the urea of para-amino-ortho-anisidin which is further decomposed into 2-methoxy-para-phenylenediamin and carbonic acid. It dyes cotton yellow shades fast to light.

The process is carried out in an analogous manner on using other of the above mentioned aminoazo compounds. The dye obtained from: meta-sulfanilic acid + ortho-anisidin dyes cotton greenish-yellow, that obtained from: 2-anisidin-4-sulfonic acid + cresidin dyes cotton reddish-yellow and that obtained from: 2-anisidin-4-sulfonic acid + para-xylidin dyes cotton yellow.

We claim:

1. The herein-described new dyestuffs being ureas of sulfonic acids of aminoazo compounds obtainable from amino-sulfonic acids of the benzene series and amins which dyes are after being dried and pulverized in the shape of their alkaline salts dark yellow powders soluble in water with a yellow and soluble in concentrated sulfuric acid with a reddish color; yielding upon reduction with stannous chlorid and hydrochloric acid an aminosulfonic acid of the benzene series and an urea of a diamin which is further decomposed into carbonic acid and a diamin; dyeing cotton yellow shades, substantially as described.

2. The herein-described new dyestuff being the urea of the azo compound obtainable from para-aminobenzene sulfonic acid and ortho-anisidin, which is after being dried and pulverized in the shape of its sodium salt a dark yellow powder soluble in water with a yellow color and soluble in concentrated sulfuric acid with a red color; yielding upon reduction with stannous chlorid and hydrochloric acid para-aminobenzene sulfonic acid and the urea of para-amino-ortho-anisidin which is further decomposed into 2-methoxy-para-phenylenediamin and carbonic acid; dyeing cotton yellow shades fast to light; substantially as described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
C. J. WRIGHT.